F. B. CORE.
PHOTOGRAPHIC CAMERA.
APPLICATION FILED MAY 28, 1910.

1,012,603.

Patented Dec. 26, 1911.
5 SHEETS—SHEET 1.

Witnesses:
Max B. A. Doring
J. M. Donshach

Inventor
Frederick B Core
By his Attorney
Phillips Abbott

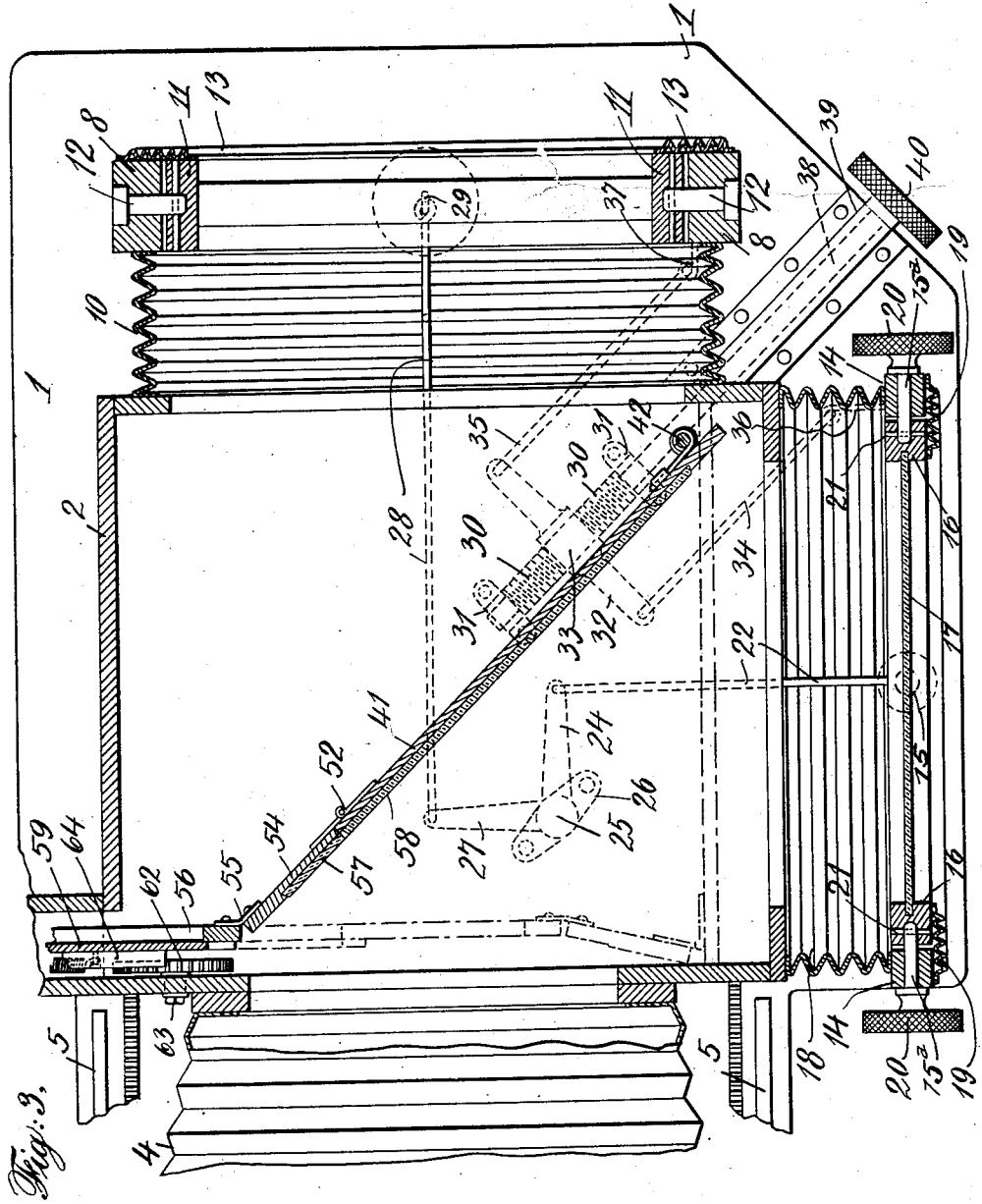

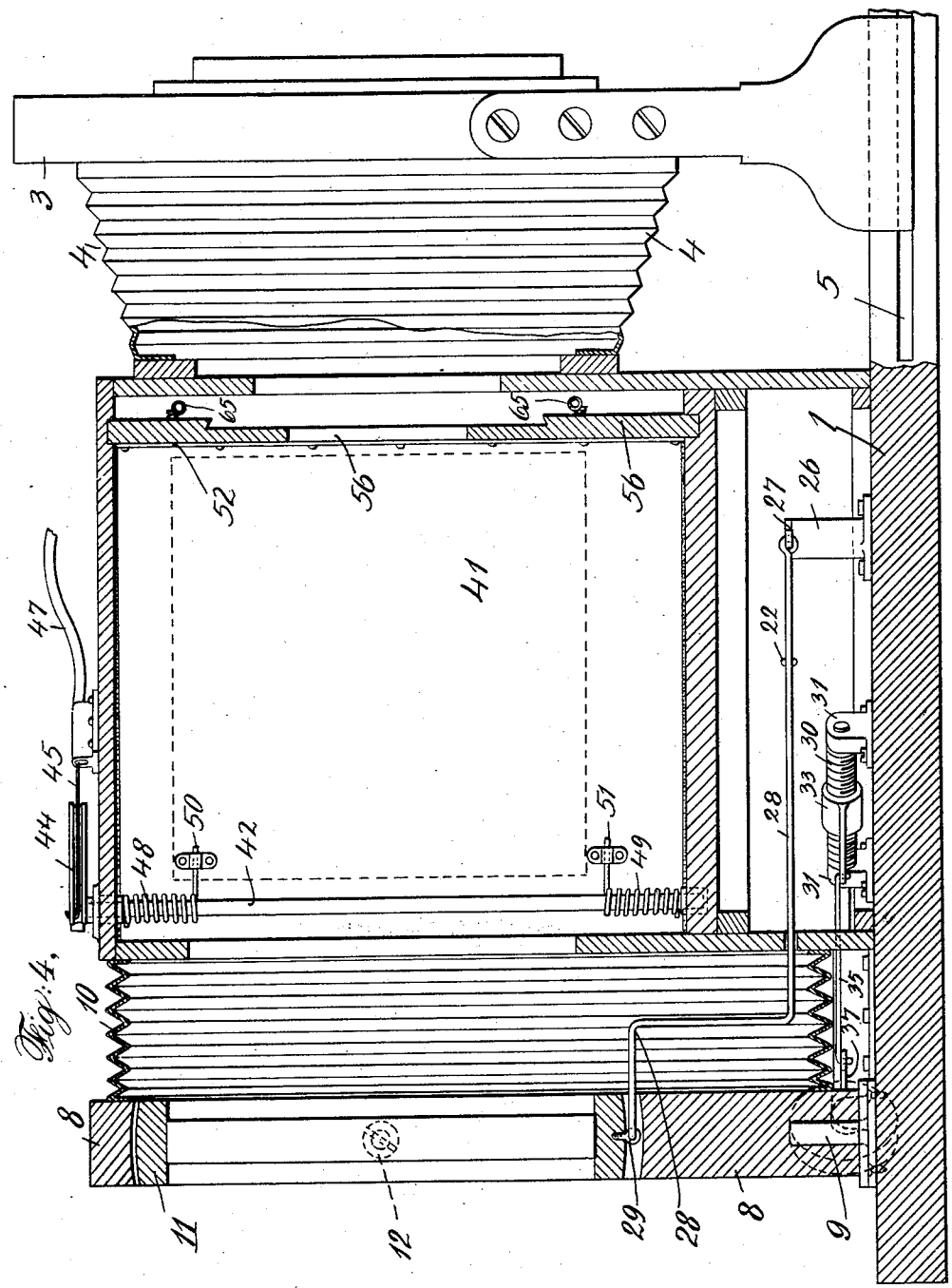

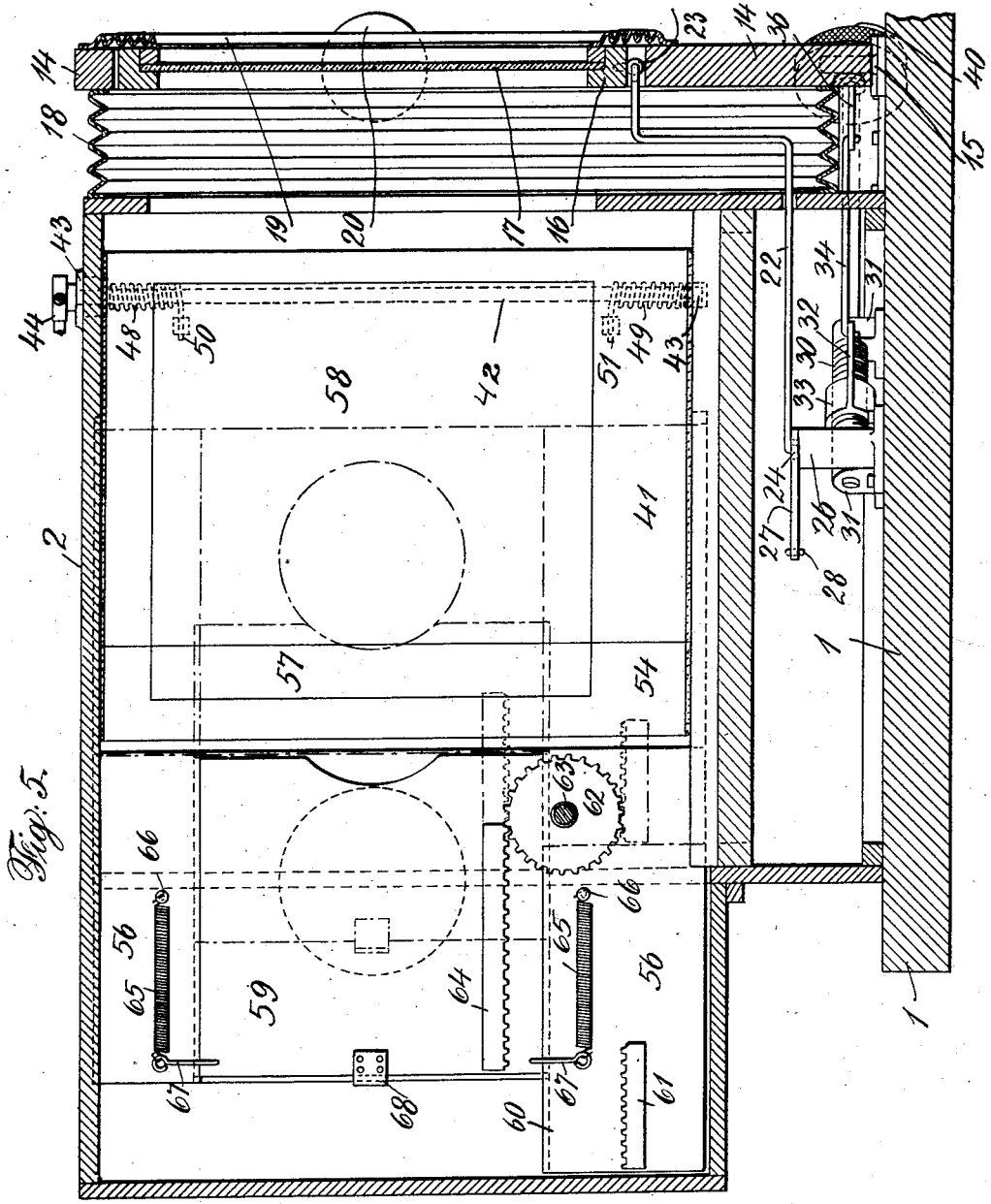

F. B. CORE.
PHOTOGRAPHIC CAMERA.
APPLICATION FILED MAY 28, 1910.
1,012,603.
Patented Dec. 26, 1911.
5 SHEETS—SHEET 5.
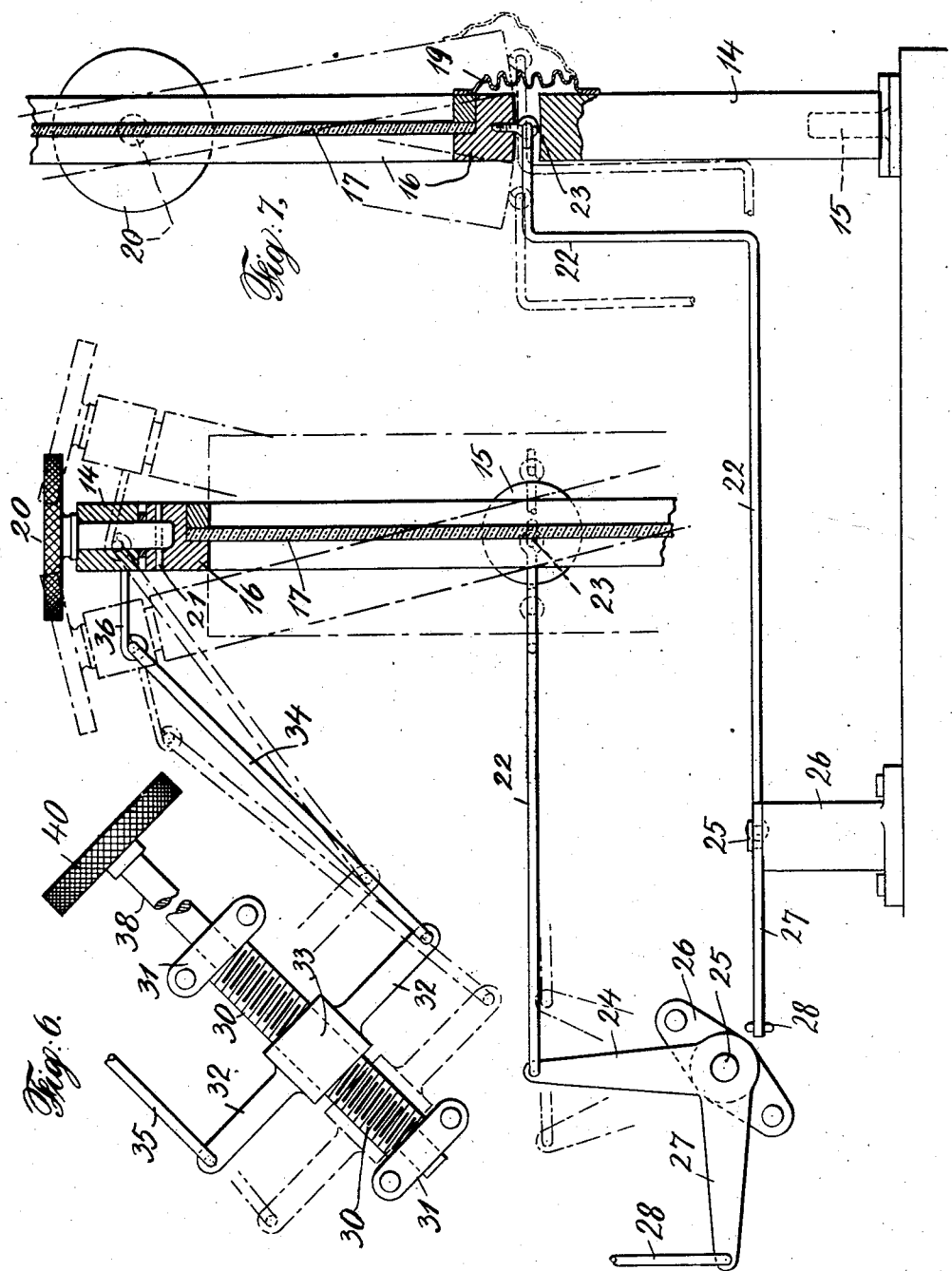
Witnesses:
Max B. A. Doring
F. W. Dausbach
Frederick B Core Inventor
By his Attorney Phillips Abbott

UNITED STATES PATENT OFFICE.

FREDERICK B. CORE, OF NEW YORK, N. Y.

PHOTOGRAPHIC CAMERA.

1,012,603.  Specification of Letters Patent.  Patented Dec. 26, 1911.

Application filed May 28, 1910. Serial No. 563,840.

*To all whom it may concern:*

Be it known that I, FREDERICK B. CORE, a citizen of the United States, and a resident of the borough of Manhattan, city, county, and State of New York, have invented a new and useful Improvement in Photographic Cameras, of which the following is a specification, reference being had to the accompanying drawings, in which—

Figure 1:
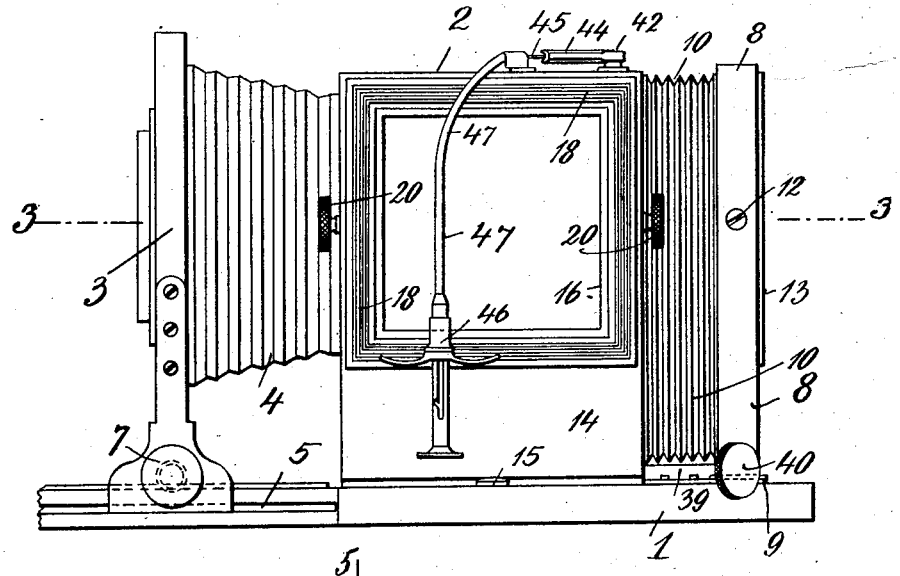
Figure 2:
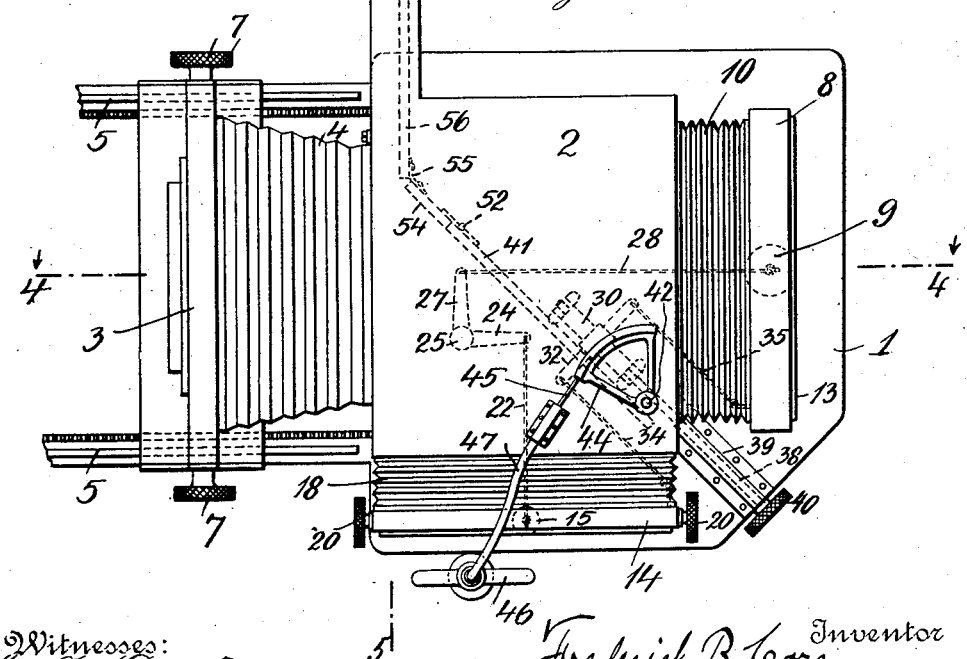

Figure 1 illustrates a side elevation of a camera embodying my invention; Fig. 2 illustrates a plan view of that which is shown in Fig. 1; Fig. 3 illustrates a horizontal sectional view taken on the line 3—3 of Fig. 1; Fig. 4 illustrates a vertical sectional view taken on the line 4—4 of Fig. 2; Fig. 5 illustrates a vertical sectional view taken on the line 5—5 of Fig. 2; Fig. 6 illustrates a detail, partly in section and partly in plan, showing the devices for simultaneously and co-extensively deflecting the sensitive surface and the focusing glass from the axial line of the camera; Fig. 7 illustrates a detail, showing the devices which simultaneously and co-extensively effect the tilting of the sensitive surface and the focusing glass relative to the horizon.

In the practice of the photographic art, great difficulty is experienced, particularly in gallery work, by the fact that many subjects, being nervously affected because their photographs are about to be taken, assume a facial expression which is unnatural and usually not agreeable, and sometimes it is difficult, if not impossible, to secure a good likeness of an animated subject because of this fact. Yet these same subjects immediately, in fact usually instantaneously, after the operator has announced that the picture has been taken, again assume a natural and pleasing expression. Also it frequently happens in doing group work, or taking the picture of a mother and child, that one or more of the subjects may be in proper focus and have a pleasing expression, and others not, and yet in a moment after the first exposure, conditions may be much more desirable than at the time of the first exposure.

It is one of the principal purposes of this invention, therefore, to so construct the apparatus as that the results hereinafter stated may all be attained, which very greatly aid the photographer and tend to the securing of more perfect work. I attain these objects by a special construction of the parts and by the use of special devices whereby such parts may be easily, accurately and quickly brought into coöperative operation each with the other.

Generally stated, the parts and their construction are as follows: There is the usual camera box proper on the front of which is an adjustable lens-carrying frame, the lens being preferably of the short focus variety. The lens frame is connected to the front of the camera box by the usual bellows, or otherwise, as preferred, and is provided with the usual appliances. On the rear of the camera is a swing back frame adapted to hold a magazine, roll films or plates, as preferred. On one side of the camera is attached a swinging focusing glass which is so arranged in conjunction with a specially constructed shutter that the operator has, at all times excepting during the instant that exposure is made, a full view of his subject on the ground glass; and special devices are provided whereby the swing back frame and the swinging focusing glass may be quickly, simultaneously, and co-extensively adjusted at exactly the desired angle relative to the axial line of the apparatus, and there are also provided other special devices whereby the inner frame of the swing back, which carries the sensitized surface, whatever special form thereof may be employed, and also the inner frame which carries the focusing glass, may be simultaneously and co-extensively tilted relative to the horizon line.

An important feature of the invention is the construction and method of operation of the shutter. It carries a mirror upon the side facing the lens when the shutter is closed, whereby the image of the subject is projected upon the focusing glass, and the construction is such that immediately following an exposure, the shutter automatically returns to primary position and again exhibits the subject to the operator upon the focusing glass, and simultaneously with these means, the sensitized surface which has been exposed automatically retires and a fresh unexposed surface takes its place.

It will be seen that because of the presence in the apparatus of the parts operating as described, the photographer is enabled first, to see his subject in the ground glass practically at all times; second, to take as many exposures in rapid succession as he desires; third, to compensate for lack of focal exactness, should the same be necessary, by quickly and easily changing the angle of the sensitized surface and of the focusing glass relative to the axial line of the instrument, and likewise to tilt these two parts relative to the horizon line and that he will be able at all times to determine the adjustment of the parts, which will secure the best results, because he has a full view of the subject at all times in the focusing glass, excepting during the instant exposure is made.

Referring now to the construction shown in the drawings, 1 represents the main base of the camera, 2 the camera box proper, 3 the lens frame which may be of any usual construction, 4 the lens bellows, 5, 5 the slideways for the lens frame, and 7, 7 the set screws to confine the lens frame at such position on the slideways 5, 5, as desired.

The swing back devices are as follows: 8 is the outer frame of the swing back, which is pivoted at 9 to the base 1 of the apparatus. 10 is the bellows connecting the swing back with the rear of the camera. 11 is the interior or tilting frame of the swing back. It is supported upon pivots 12, 12, whereby it is adapted to tilting movement relative to a vertical plane. 13 is a flexible extendible structure connecting the outer and inner frames of the swing back, whereby light is prevented from entering through the crack between the two frames.

The focusing devices are shown best in Fig. 3. 14 is an exterior frame which is pivoted at 15 to the base 1 of the apparatus. 16 is an interior frame which carries the ground glass or other focusing surface 17. 18 is the bellows which connect the exterior focusing glass frame 14 to the side of the camera and 19 is a flexible and extendible structure, similar to the structure 13, connecting the outer and inner frames of the focusing glass structure, preventing the entrance of light through the crack between the outer and inner focusing glass frames. The inner frame 16 is pivoted upon two pins or centers 15ª provided with thumb nuts 20, 20, whereby the inner frame 16 may be tilted positively and thus power applied to the devices about to be described, and in order to effect this, I prefer to pass pins 21 through the ends of the pins of the thumb nuts 20, 20, as shown, and through the inner frame 16.

The devices referred to are those whereby the tilting of the ground glass frame and likewise the inner frame of the swing back, which carries the sensitive surface, may be tilted relative to a vertical line. They are as follows: A rod 22, preferably made angular in form, as shown best in Figs. 4, 5 and 7, is pivotally connected by a screw eye 23, or otherwise, to the lower cross bar of the swinging frame 16 which carries the focusing glass. This rod 22 connects at its inner end with one arm 24 of a bellcrank which is pivoted at 25 upon a suitable support 26 which, as shown best in Fig. 4, is fastened to the base 1 of the apparatus below the floor of the camera proper. The other end 27 of the bellcrank connects with another rod 28 which pivotally engages, as by a screw eye 29, with the lower cross bar of the inner frame 11 which carries the sensitive surface of the swing back.

By the construction and arrangement of the parts last described, it will be noted that the operator who observes his subject by looking through the focusing glass, as usual, can tilt that glass forward or backward relative to a vertical line, as he desires, by turning the thumb screws 20, 20, and that in so doing, he will, through the instrumentality of the rod 22, the bellcrank 24, 27 and the rod 28, simultaneously and co-extensively tilt the frame in the swing back, which carries the sensitive surface, and that under all conditions and in all the positions of the parts, this contemporaneous and co-extensive movement of these two frames will inevitably occur.

The devices whereby the two outer frames, to wit, the outer frame of the swing back and the outer frame of the focusing glass are swung upon their respective pivots will now be described. They are best seen in Figs. 3 and 6. 30 is a threaded bar which is supported upon bearings 31, 31, fastened to the base of the apparatus, as best seen in Fig. 4. 32 is a yoke which has a hub 33 which is interiorly threaded to correspond with the threads on the bar 30 and from the ends of this yoke extend rods 34 and 35 respectively. The rod 34 extends to and pivotally connects with an arm 36 which projects inwardly from one corner of the exterior frame 14 of the focusing glass, and the rod 35 extends to and pivotally connects with an arm 37 which projects inwardly from one corner of the outer frame 8 of the swing back. An extension 38 of the threaded bar 30 extends through a guiding and supporting frame 39 which is fastened to the base 1 of the apparatus and to the outer end of the extension 38 is attached a thumb screw 40.

By the construction and arrangement of the parts last described, it will be seen that the operator, upon simply turning the thumb screw 40, will, through the instrumentality of the threaded bar 30, the yoke 32, with its threaded hub 33 and the two connecting rods 34 and 35 connecting respectively with the arms 36 and 37, simultaneously and co-extensively swing the outer focusing frame and the outer swing back frame into such positions as he desires.

Referring now to the shutter, any preferred form may be used, provided it has upon its face a mirror arranged to reflect the image onto the focusing-glass. I show in the drawings hereof such a shutter, of, however, a special and unusual construction. It is best shown in Figs. 3 and 5. The shutter is composed of three parts pivotally connected. 41 is the main or larger part. It is attached to a vertical shaft 42 which is supported in bearings 43, 43, at the top and bottom. On the outwardly projecting end of the shaft is a sector 44 in the curved groove on the periphery of which a draft wire 45 from the engine 46 engages. The draft wire passes through a flexible tubular structure 47. Any other equivalent means for actuating the shutter may be employed. 48 and 49 are two springs, one end of each of which is fast to some rigid part of the structure and the other end of each of which, 50 and 51 respectively, engages with the shutter. To the free or swinging edge of the section 41 of the shutter there is pivoted, by any suitable hinge devices 52 (see Fig. 3) another section 54 of the shutter and to the outer edge of this section 54 there is likewise pivoted, preferably by rubber, leather, or equivalent light-tight means 55, another section 56 of the shutter. Upon the side of the sections 41 and 54 presented toward the lens there are mirrors 58 and 57 respectively and upon the part 56 of the shutter there is supported what I call a supplemental shutter 59 which slides in a slideway 60 (see Fig. 5) made upon the part 56 of the shutter, and upon this last-named part a rack 61 is arranged, which engages with a gear or pinion 62 which is pivoted at 63 to the wall of the camera, see Fig. 3, and upon the part 59 is arranged a similar rack 64 adapted to engage with the upper arc of the pinion 62. Two springs 65, 65, each attached at one end 66, 66, to the part 56, and at their other ends connected with arms 67, 67, projected laterally from the part 59, normally compel the part 59 to move with the part 56 until the pinion 62 engaging with both racks 61 and 64, effects an outward movement of the part 59, thus presenting the exposure opening. A rectangular clip 68 which is fastened to the part 59, as shown in Fig. 5, laps over the edge of the part 56 and acts as a stop to limit the movement of the part 59 under the action of the springs 65, 65. The top and bottom edges of the parts 41 and 54 are lined with black velvet, or equivalent material, so as to make the joint light-tight and prevent noise, yet not interfere with the swinging or other movements of the parts as they open and close.

The operation of the shutter mechanism is as follows: The reflection of the image or subject passing inwardly through the lens and the lens bellows, impinges upon the surface of the mirrors 57 and 58, and owing to the angular position at which these mirrors are placed, the image is reflected upon the focusing glass in a manner well understood. The operator, looking through his ground glass, carefully adjusts all parts of the apparatus so as to secure the best focal and other photographic effects, by proper manipulation of the thumb screws 40, whereby the outer frame of the focusing devices and the outer frame of the swing back are swung as may be requisite, and he likewise by proper manipulation of the thumb screws 20, 20, effects the tilting of the inner frames of these devices respectively as occasion may require. Thereupon he operates the engine which through the instrumentality of the devices above explained, causes the section 41 and the section 54 of the shutter to swing from the position shown in full lines in Fig. 3 into the position shown in dotted lines in this same figure, and in so doing, these two sections serve to pull forwardly the remaining section 56 of the shutter, which, however, instead of swinging, moves along a suitable slideway provided for it, and this section 56 of the shutter in its movement carries the supplemental section 59 with it until the rack 64 on that section engages with the pinion 62. Thereupon, owing to the rack 61 which controls the lower arc of the pinion 62 being moved in one direction, obviously the upper arc of the same pinion must move in the opposite direction, and consequently the supplemental section 59, which, prior to this time, acts as a closure for the exposure opening, is rapidly moved to the left of the apparatus, as shown in Fig. 5, the springs 65 being put under tension. Thus the exposure is rapidly made.

The moment the operator has made the exposure, he releases the engine, whereupon, through the instrumentality of the springs 48, 49, the shutter and all its parts are again instantly returned to primary position, closing the camera, and the operator who all this time has been looking at his ground glass again sees the image of the subject therein, his view thereof having been cut off for only an instant during the opening and closing of the shutter. The subject, whether one or a group, supposing the picture to have been taken, loses the undesirable facial expression or attitude that most subjects are apt to assume, and returns to normal expression, attitude and appearance, so that the operator is frequently able to obtain a much better likeness and much more satisfactory negatives by again, just at this moment, making a second exposure. Of course the magazine or other apparatus, now well known and which does not require explanation, will meantime have removed the exposed sensitized surface from the field and have supplied a fresh unexposed surface. It will be understood that the photographer need not make this second exposure unless he desires so to do, but my experience of many years shows me that it it frequently desirable and most satisfactory to make not only two, but a series of exposures of the same subject in quick succession, for it will almost always happen that of a series, one will be much more satisfactory than the others.

It will be obvious to those who are familiar with this art that modifications may be made in the details of construction of the parts involved in my invention without departing from the essentially valuable features thereof. For this reason I do not limit myself to the specific construction and arrangement of the parts as shown. They constitute one form and in my judgment a desirable form, but by no means the only form, in which my invention may be carried out. Also it will be obvious that my invention can be beneficially employed without the embodiment in the same structure of all the co-actively operating devices which I prefer to employ conjointly; that is to say, a suitable shutter with short focus lens and focusing glass adapted to receive the full field of the lens may be used beneficially with the swing back feature; also a suitable shutter and the swinging and tilting devices of the focusing glass and swing back may be used with a short or a long focus lens; in short, various modifications or adaptations of the parts may be made for reasons of economy or for special work, as, for instance, view or landscape work as compared with gallery work or portraiture. All these things are well understood by photographers and do not require elaboration here. I desire to say, however, that having had long experience in gallery work, particularly in juvenile portraiture and group work, I believe the apparatus above described and illustrated constitutes the best photographic apparatus known to date for such use.

I claim:

1. In a photographic camera, the combination of a lens frame adjustable toward and from the focal plane, a shutter, a mirror upon the face of the shutter adapted to reflect the image received from the lens upon a focusing-glass, a focusing-glass, means whereby the focusing-glass may be adjusted vertically and horizontally, means for the support of a sensitive surface, and devices whereby the sensitive surface may also be adjusted vertically and horizontally.

2. In a photographic camera, the combination of a lens frame adjustable toward and from the focal plane, a shutter, a mirror upon the face of the shutter adapted to reflect the image received from the lens upon a focusing-glass, a focusing-glass, means for the support of a sensitive surface, devices whereby the focusing-glass and the sensitive surface may be simultaneously and co-extensively swung vertically and other means whereby they may be simultaneously and co-extensively tilted horizontally.

3. In a photographic camera, the combination of a lens frame, a shutter carrying a mirror adapted to project the whole area of the image reflected from the lens upon a focusing-glass, a focusing-glass, devices whereby the focusing-glass may be adjusted vertically and horizontally, means for the support of a sensitive surface, and devices whereby the sensitive surface may also be adjusted vertically and horizontally.

In testimony whereof I have signed my name to this specification in the presence of two subscribing witnesses.

FREDERICK B. CORE.

Witnesses:
PHILLIPS ABBOTT,
EDWIN F. VALENTINE.

---

Copies of this patent may be obtained for five cents each, by addressing the "Commissioner of Patents, Washington, D. C."